(12) United States Patent
Ganesh et al.

(10) Patent No.: US 9,275,065 B1
(45) Date of Patent: Mar. 1, 2016

(54) BEHAVIORAL ENGINE FOR IDENTIFYING ANOMALOUS DATA ACCESS PATTERNS

(75) Inventors: Anantharaman Ganesh, Sunnyvale, CA (US); Anindya Banerjee, Pune (IN); Bijayalaxmi Nanda, Iselin, NJ (US)

(73) Assignee: Symantec Corporation, Mountain View, CA (US)

( * ) Notice: Subject to any disclaimer, the term of this patent is extended or adjusted under 35 U.S.C. 154(b) by 397 days.

(21) Appl. No.: 13/191,201

(22) Filed: Jul. 26, 2011

Related U.S. Application Data

(60) Provisional application No. 61/423,053, filed on Dec. 14, 2010.

(51) Int. Cl.
*G06F 17/30* (2006.01)

(52) U.S. Cl.
CPC ............... *G06F 17/30144* (2013.01)

(58) Field of Classification Search
CPC ................................. G06F 17/30144
USPC ........................................... 707/781
See application file for complete search history.

(56) References Cited

U.S. PATENT DOCUMENTS

| | | | |
|---|---|---|---|
| 7,506,371 B1 * | 3/2009 | Ben-Natan ............. | 726/18 |
| 7,865,958 B2 * | 1/2011 | Lieblich et al. ........ | 726/25 |
| 8,458,462 B1 * | 6/2013 | Hanna .................... | 713/163 |
| 2011/0185436 A1 * | 7/2011 | Koulinitch et al. .... | 726/28 |
| 2011/0321175 A1 * | 12/2011 | Slater .................... | 726/28 |

OTHER PUBLICATIONS

Ramkumar Chinchani et al., "Towards the Scalable Implementation of a User Level Anomaly Detection System," [retrieved Feb. 27, 2015], 6 pages, Internet: <http://www.google.com/url?sa=t&source=web&cd=3&ved=0CDIQFjAC&url=http%3A%2F%2Fciteseerx.ist.psu.edu%2Fviewdoc%2Fdownload%3Fdoi%3D10.1.1.8.6289%26rep%3Drep1%26type%3Dpdf&rct=j&q=user%20activity%20anomaly%20detection&ei=ravtTMGvCoT58Ab3zbiLAQ&usg=AFQjCNHx5HGsAccB7DYqnsyPzwgvi_EGCw>, 2002.

* cited by examiner

*Primary Examiner* — Kris Mackes
(74) *Attorney, Agent, or Firm* — Wilmer Cutler Pickering Hale and Dorr LLP

(57) ABSTRACT

A computing device receives data access records and determines a user data access behavior pattern for a user based on the data access records. The computing device receives new data access records and identifies any deviation from the user data access behavior pattern based on the new data access records. Upon identifying deviation from the user data access behavior pattern, the computing device generates an alert indicating that the user has deviated from the user data access behavior pattern.

18 Claims, 7 Drawing Sheets

BEHAVIORAL ENGINE FOR IDENTIFYING ANOMALOUS DATA ACCESS PATTERNS

RELATED APPLICATIONS

This patent application claims the benefit under 35 U.S.C. §119(e) of U.S. Provisional Application No. 61/423,053, filed Dec. 14, 2010, which is herein incorporated by reference.

FIELD OF INVENTION

Embodiments of the invention relate to file systems, and more particularly to the detection of anomalous user data access behavior.

BACKGROUND OF THE INVENTION

Many organizations such as health care organizations, financial organizations, manufacturing organizations, etc. use data loss prevention (DLP) products to monitor and protect unstructured data. DLP products detect user activity on data, and determine whether the data contains confidential information. The DLP products then perform predetermined actions when they determine that the data contains confidential information. However, conventional DLP products do not determine normal user behavior or identify anomalous user behavior with regards to data accesses.

SUMMARY OF THE INVENTION

In one embodiment, a computing device receives data access records and determines a user data access behavior pattern for a user based on the data access records. The computing device receives new data access records and identifies any deviation from the user data access behavior pattern based on the new data access records. Upon identifying deviation from the user data access behavior pattern, the computing device generates an alert indicating that the user has deviated from the user data access behavior pattern.

In one embodiment, determining the user data access behavior pattern comprises computing at least one of an average or a median of data access activity for the user based on the data access records and computing an activity threshold for the user based on at least one of the average or the median of the data access activity. In one embodiment, identifying the deviation from the user data access behavior pattern comprises determining, from the new data access records, whether new data access activity for the user exceeds the activity threshold.

In one embodiment, the new data access records are for a new day, and determining the user data access behavior pattern comprises computing a weekly average user data access count over a time period based on the data access records, computing a standard deviation of the user data access count, and using the standard deviation and the weekly average user data access count to set an activity threshold. In one embodiment, identifying deviation from the user data access behavior pattern comprises determining a user data access count for the new day from the new data access records, determining user data access counts for six previous days from the data access records, combining the user data access count for the new day to the user data access counts for the six previous days to determine a current week's user data access count, and identifying that the current week's user data access count exceeds the activity threshold.

In one embodiment, the computing device receives the data access records and the new data access records from at least one of a data access log of a storage server or an agent hosted by the storage server that intercepts all data access requests and reports them to the computing device. In one embodiment, the computing device determines a data access pattern for a particular file based on the data access records and determines whether the new data access records show a deviation from the data access pattern for the particular file.

In one embodiment, a computer readable medium includes instructions that will cause a processor that executes the instructions to receive data access records and determine a user data access behavior pattern for a user based on the data access records. The instructions further cause the processor to receive new data access records and identify any deviation from the user data access behavior pattern based on the new data access records. Upon identifying deviation from the user data access behavior pattern, the processor generates an alert indicating that the user has deviated from the user data access behavior pattern.

In one embodiment, a method for identifying abnormal user data access behavior comprises receiving data access records and determining a user data access behavior pattern for a user based on the data access records. The method further comprises receiving new data access records and identifying any deviation from the user data access behavior pattern based on the new data access records. The method further comprises generating an alert indicating that the user has deviated from the user data access behavior pattern upon identifying deviation from the user data access behavior pattern.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
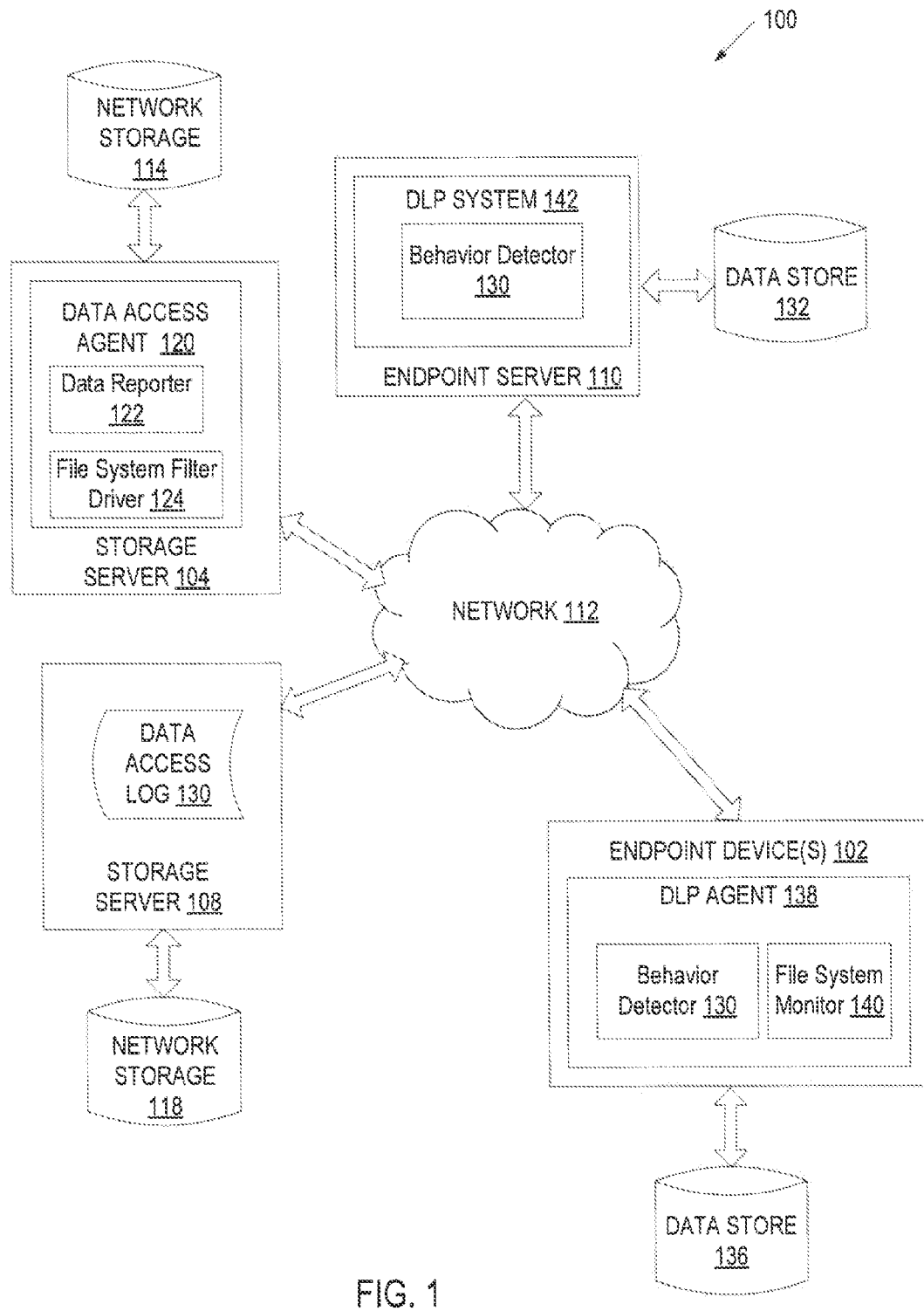
FIG. 1 illustrates an exemplary network architecture in which embodiments of the invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "receiving", "identifying", "generating", "computing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A method and apparatus for determining a data access behavior pattern and deviation from the data access behavior pattern are described. Embodiments of the present invention enable a data loss prevention (DLP) system to determine anomalous behavior for users and/or groups of users. This anomalous behavior may signify that a user is performing malicious activity. Embodiments of the present invention therefore provide a novel mechanism to detect and/or prevent data loss.

In an example, a user data access behavior pattern may be generated for an employee of a company. When the employee is laid off, that employee may delete files, rename files, copy a large quantity of files, etc. in retaliation. Embodiments of the present invention would detect that the user's current activity deviates from that user's data access behavior pattern, and may cause an alert to be generated.

FIG. 1 is a block diagram of an exemplary network architecture 100, in which embodiments of the present invention may operate. The architecture 100 includes multiple storage servers 104, 106, 108 networked to endpoints 102 and/or an endpoint server 110 via a network 112. The network 112 may be a private network (e.g., a local area network (LAN), wide area network (WAN), metropolitan area network (MAN), etc.), a public network (e.g., the Internet), or a combination of private and/or public networks.

Each endpoint device 102 may be a personal computer (PC), a laptop, a mobile phone, a server computer, or any other computing device. The endpoint devices 102 each run an operating system (OS) that manages hardware and software of the endpoint devices. The OS may be, for example, Microsoft® Windows®, Linux®, Symbian®, Apple's® OS X®, Solaris®, etc. One or more applications run on top of the OS and perform various operations that involve accessing, moving, or otherwise manipulating data residing in a local data store 136 and/or network storage 114, 116, 118. For example, the applications may include a CD or DVD burning application, an email application, a web browser, an instant messaging application, a printing application, a print screen function, etc. In one embodiment, the applications perform the operations in response to receiving user instructions.

Each endpoint device 102 may include and/or be connected to a data store 136, which may be a hard disk drive, solid state drive (SSD), tape backup, optical drive, volatile memory (e.g., random access memory (RAM)), or other storage device. The data store 136 may be a private data store that is not shared with other endpoint devices on the network 112. Each endpoint device 102 may additionally have access to network storage 114, 116, 118 provided by one or more storage servers 104, 106, 108.

In one embodiment, endpoint devices 102 include a data loss prevention (DLP) agent 138 that monitors data loss vectors to ensure that sensitive (e.g., confidential) information does not leave the endpoint device for illegitimate purposes. The DLP agent 138 may scan data as it moves through a data loss vector, when a request to send the data through a data loss vector is received and/or when a command to access data is received. The DLP agent 138 may additionally monitor for data accesses to files stored in the local data store 136 and/or on network storage 114, 116, 118. The data accesses may be operations of one or more applications to read, write, modify, rename, etc. stored data. The DLP agent 138 may implement a DLP policy to determine whether the data is sensitive data (includes sensitive information). The DLP policy may specify a type of content to be monitored (e.g., messages, displayed data, stored documents, etc.), how to identify sensitive data, how to identify suspicious behavior, and/or an action to be performed when sensitive data is detected or when suspicious behavior is detected.

In one embodiment, the DLP agent 138 includes a file system monitor 140 to monitor operations that are performed via a file system. In one embodiment, the file system monitor 140 includes a file system hook that intercepts commands to access, store, modify, etc. files stored remotely on network storage 114, 116, 118 and locally on the local data store 136. The file system monitor 140 may also include one or more drivers (e.g., file system filter drivers, device drivers, etc.) and/or kernel modules. For example, the file system monitor 140 may include one or more file system filter drivers that can determine which applications start or stop executing (e.g., by intercepting OS calls for process creation or deletion), and that can identify I/O requests (including the file being accessed, the application accessing the file, an indication as to whether the file being accessed is stored on a remote or local storage device, etc.) of executing applications.

In one embodiment, the DLP agent 138 reports data access events to DLP System 110. Alternatively, or in addition, DLP agent 138 may include a behavior detector 130 that analyzes the data access events to identify anomalous behavior. The behavior detector 130 may maintain data access records based on the detected data access events, and may additionally receive data access records from one or more storage servers. The behavior detector 130 may use the data access records to determine a user data access behavior pattern and to determine whether a user's recent data access activity deviates from the determined user data access behavior pattern. Such deviations from user data access behavior patterns may be flagged as suspicious activity.

Storage servers 104, 106, 108 are computing devices configured to serve storage over network 112 using file-based protocols (e.g., network file system (NFS), common internet file system (CIFS), file transfer protocol (FTP), etc.) and/or block-based protocols (e.g., fibre channel (FC), internet small computer system interface (iSCSI), etc.). Each storage server 104, 106, 108 manages a network storage 114, 116, 118. The network storage 114, 116, 118 may include a storage area network (SAN), a network attached storage (NAS), or a combination of both SAN and NAS. Examples of storage servers include a Windows® File Server, a NetApp® Filer, a Microsoft® Sharepoint® server, and IBM® Enterprise Storage Server, Veritas® Storage Exec Server, etc.

Network storage 114, 116, 118 and local data store 136 may contain data that includes sensitive information. The data may include files (e.g., documents), tables, or other data formats. Examples of sensitive information include source code, patient health information, insurance claims, product formulas, legal documents, merger and acquisition documents, sales and marketing reports, social security numbers, credit card numbers, etc.

Each storage server may include a mechanism for identifying and/or recording data access events. Examples of data access events include opening a file, renaming a file, creating a new directory, renaming a directory, accessing a database, and so on. These data access events may later be reviewed to determine whether any of the data access events were on data that contain sensitive information. In one embodiment, storage server 104 includes a data access agent 120 that monitors access events on network storage 114. The data access agent 120 includes a file system filter driver 124 that captures access events. The file system filter driver 124 may intercept the access events before they are sent to a file system. The file system filter driver 124 may block the access, and send a confirmation request to endpoint server 110. The file system filter driver 124 may then allow the access upon receiving confirmation from the endpoint server 110, or may permanently or indefinitely block the access if no such confirmation is received. Data access agent 120 further includes a data reporter 122 that reports the access events to endpoint server 110 and/or to endpoint 102. Data reporter 122 may report the data access events to endpoint server 110 and/or endpoint 102 as those data access events are detected. Alternatively, data access agent 120 may record data access events as data access records. Data reporter 122 may then periodically report data access records to endpoint server 110 and/or endpoint 102. Additionally, data reporter 112 may send data access records to endpoint server 110 and/or endpoint 102 upon request.

In one embodiment, storage server 108 maintains a data access log 130. The data access log 130 may be, for example, an audit log (e.g., as maintained by Microsoft Sharepoint). In other examples, the data access log 130 may be a New Technology File System (NTFS) journal log, a Veritas File System (VxFS) file change log, etc. The data access log 130 may include detailed information on data access events, such as file name, operation type, timestamp, identification of application that performed the operation, network address of client that requested the operation, creates, links, unlinks (deletions), renamed files, data changes, metadata changes, etc. In one embodiment, the data access log 130 wraps around, so that oldest records are replaced by newer records. In one embodiment, the data access log 130 is maintained in flat files. Alternatively, the data access logs 130 may be stored in a database. Endpoint server 110 and/or endpoint 102 may access the data access log 130 by querying storage server. In one embodiment, data access log 130 may be accessed in the same manner that any other data stored in network storage 118 is accessed.

Endpoint server 110 is a server computing device that includes a data loss prevention server 142. DLP System 142 receives data access events from one or more storage servers 104, 106, 108 and/or DLP agents 138. For some storage servers (e.g., storage server 108), DLP System accesses the data access log 130 maintained by the storage server 108 to obtain access event information. For other storage servers (e.g., storage server 104), DLP System 110 is registered to receive access events from a data access agent (e.g., data access agent 120). These access events may be received in real time as the storage server 104 receives access requests, or may be received as data access records after the data access event has already occurred.

In one embodiment, endpoint server 110 is connected to a data store 132, on which DLP System 142 stores received access events. In one embodiment, data store 132 is a database. The database may be a compact database that uses delta encoding (in which differences are recorded between versions of data rather than new copies of the data being stored). In one embodiment, the data store 132 includes an index that can be used to quickly search through the data store 132 for recorded access events that match specific criteria.

DLP System 110 includes a behavior detector 130. Behavior detector 130 analyzes access events/records to determine data access behavior patterns. This may include determining a data access average, a data access median, a standard deviation, etc. from the data access records. In one embodiment, behavior detector 130 determines user data access behavior pattern for users. A different user data access behavior pattern may be generated for each user that identifies normal (e.g., average and/or median) data access behavior for that user. When new data access records for that user are received, the behavior detector 130 may determine whether the new data access records show a deviation from the user's data access behavior pattern.

Figure 2:
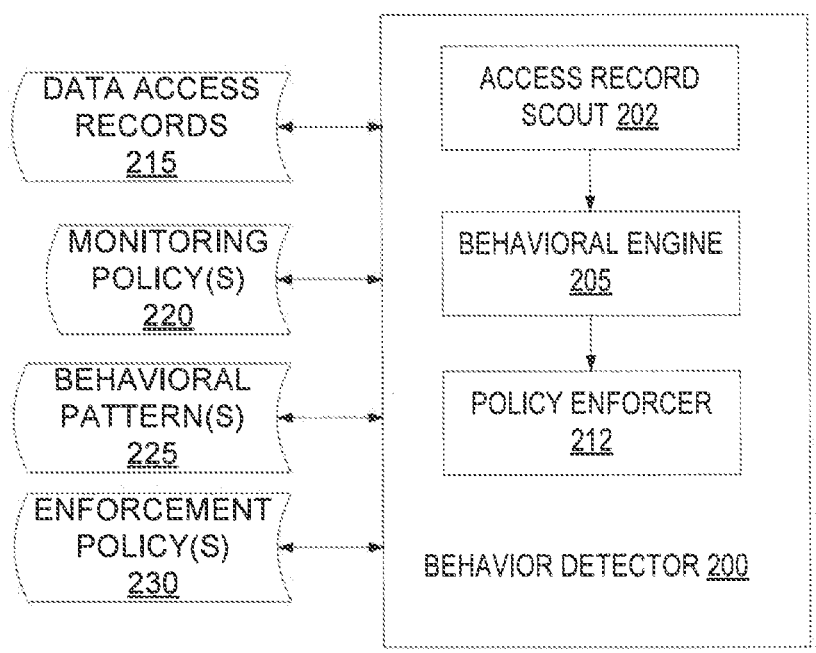
FIG. 2 is a block diagram of one embodiment of a behavior detector.

FIG. 2 is a block diagram of one embodiment of a behavior detector 200. The behavior detector 200 may correspond to behavior detector 130 of FIG. 1. The behavior detector 200 in one embedment includes an access record scout 202, a behavioral engine 205 and a policy enforcer 212. Alternatively, the behavior detector 200 may include a subset of these components, or may contain more components.

Access record scout 202 obtains data access records 215, and may store the data access records in a data store (e.g., in a database). In one embodiment, the data access records are 5 tuples that include a user state, access type (e.g., rename, rename dir, delete, make dir, create, etc.), IP address from which the access was made, name of data accessed, and a timestamp. Alternatively, the data access records may include other data. The data access records 215 may be obtained from one or more storage servers and/or from one or more endpoints. In one embodiment, the data access records 215 are obtained from a database. In one embodiment, access record scout 202 receives data access records in response to sending queries to the endpoints and/or storage servers (referred to as a data pull model). In another embodiment, access record scout 202 receives data access records automatically without requesting them (referred to as a data push model). Alternatively, both a data push model and a data pull model may be implemented.

Behavioral engine 205 analyzes data access records 215 to determine data access behavior patterns 225. Behavioral engine 205 may determine data access patterns for users, for specific files, for specific network folders, for groups of users, etc. Behavioral engine 205 may also correlate data access behavior patterns to days of the week, time of day, file location, particular servers, types of data access (e.g., read, write, delete, modify, etc.), types of files (e.g., sensitive vs. nonsensitive files, documents, emails, spreadsheets, etc.) etc. An administrator may configure a detection policy that controls what types of data access behavior patterns to generate and how long a time period is taken into consideration to compute the data access behavior patterns. For example, behavioral engine 205 may generate a user data access behavior pattern 225 that identifies normal user data access behavior with respect to sensitive or confidential information. Information may be categorized as sensitive information by a DLP agent or DLP System.

In one embodiment, behavioral engine 205 generates a separate user data access behavior pattern 225 for each user. In one embodiment, the user data access behavior pattern 225 is generated by computing an average data access count and/or a median data access count. The average data access count may be a simple count of all data accesses performed by that user. Alternatively, multiple data access counts may be maintained for different types of data accesses and/or for different types of data. For example, an average read data access count and an average write data access count may be generated. In another example, an average sensitive data access count and an average non-sensitive data access count may be generated. The average and/or median may be a daily average, a weekly average, a monthly average, etc. In one embodiment, an exponentially weighted moving average is used. Therefore, more recent data access activity may be weighted more heavily than older data access activity.

In addition to computing the average and/or median, behavioral engine 205 also computes a standard deviation. Behavioral engine 205 uses the standard deviation and the average (or median) to determine an activity threshold. The activity threshold may be, for example, one standard deviation above the average, two standard deviations above the average, three standard deviations above the average, etc. In one embodiment, behavioral engine 205 assigns a minimum data access count to a user data access behavior pattern. In one embodiment, both the activity threshold and the minimum data access count need to be exceeded to determine that a user has deviated from his user data access behavior pattern.

The behavioral engine 205 may store the behavior pattern 225 (including the average, standard deviation, the activity threshold and/or the minimum data access count). The behavioral engine 205 may use stored behavioral patterns 225 for later comparison with user access records. Behavioral engine 205 may recompute the behavior pattern 225 periodically or each time a user's data access behavior is to be checked. In one embodiment, the user data access behavior pattern 225 is recomputed each day.

After new data access records are received, behavioral engine 205 compares the new data access records to the data access behavior pattern 225 for a user. If the new data access records show that the user has deviated from his data access behavior pattern, then policy enforcer 212 is notified. In one embodiment, behavioral engine 205 determines that the user has deviated from his data access behavior pattern if the data access count for a current day, week, month, etc. exceeds the average data access count by more than the activity threshold and the minimum data access count is exceeded. The new data access records may then be compared to the user data access behavior pattern to determine whether the user has deviated from it.

In one embodiment, policy enforcer 212 is notified that the user has deviated from his user data access behavior pattern if:

$C_{Day} > M$; and $C_{Week} > Avg_{Week} + \sigma N$

Where $C_{Day}$ is the current day's data access count, M is the minimum activity count for an alert to be generated, $C_{Week}$ is the current week's data access count, $Avg_{Week}$ is the weekly average data access count, $\sigma$ is the standard deviation and N is the number of allowed standard deviations from the weekly average data access count. Therefore, the notification may be based not simply on the activity count for a single day, but based on how a single day's activity count affects a weekly activity count. This minimizes the standard deviation that might otherwise be caused by low weekend activity, while still incorporating any weekend activity that does occur.

Note that in addition to, or instead of, a user data access behavior pattern, behavioral engine 205 may generate a data access behavioral pattern for specific data that is user independent. In such an example, behavioral engine 205 could determine the average weekly data access count of all users on data in a specific directory. The behavioral engine 205 could then determine whether data access activity for data in that directory exceeds normal levels. Additionally, data access behavior patterns may be generated for groups of users (e.g., all users in a company's finance department), for applications, and so on. All of the embodiments described herein with reference to user data access behavioral patterns may be modified to operate on data access patterns other than user data access behavior patterns.

Policy enforcer 212 applies one or more enforcement policies 230 after behavioral engine 205 determines that a user has deviated from his data access behavior pattern. Applying an enforcement policy may include sending a notification to an administrator, preventing data from exiting an endpoint device through a data loss vector, locking down the computer so that no data can be moved off of the endpoint device through any data loss vector, encrypting data as it is moved off the endpoint device, and so on. In one embodiment, the policy enforcer 212 reports the violation of enforcement policies 230 to an administrator. Such reports may be sent in real-time, periodically, based on some administrator designed trigger, etc.

In one embodiment, policy enforcer 212 generates an incident report noting the violated enforcement policy 230 and the circumstances surrounding the violated enforcement policy 230. The incident report may identify an application, user, data loss vector, type of sensitive data (e.g., social security number, credit card number, etc.), number of data accesses, amount that the access threshold was exceeded, a breakdown of data access types, etc. associated with the policy violation. The incident report may also include a time stamp showing when the policy violation occurred. In one embodiment, policy enforcer 212 assigns a rating indicative of a risk that the user is performing malicious activity based on an analysis of the new data access records and the user data access behavior pattern. A low risk rating indicates that the user poses a low risk, and a high risk rating indicates that the user poses a high risk. The assigned rating may depend on the number of data access events performed by the user that were associated with sensitive information, types of operations performed on the sensitive information, the frequency with which the user performs operations on sensitive information, the amount of sensitive information that the user has performed operations on, etc.

In one embodiment, behavior detector 200 receives an access request each time a user attempts to access data. For example, if a user attempts to read a file, behavior detector 200 may receive an access request from an agent resident on a file server. Behavioral engine 205 may then determine whether the access request causes the user to deviate from a behavior pattern. If the access causes the user to deviate from the behavior pattern, policy enforcer 212 may prevent the access request from being allowed. Alternatively, if the access does not cause the user to deviate from the behavior pattern, policy enforcer may send a message to a file server to cause the file server to stop blocking the access.

Figure 3:
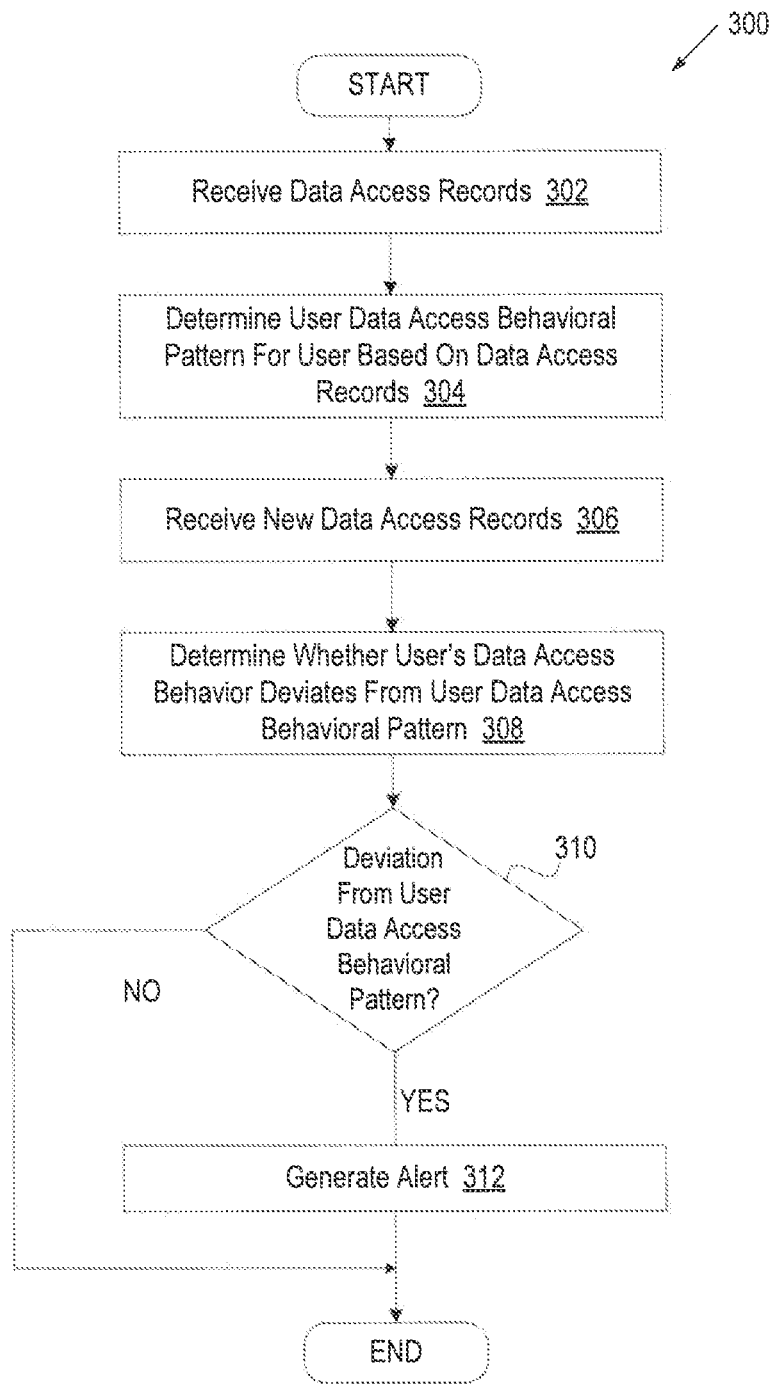
FIG. 3 is a flow diagram of one embodiment of a method for identifying abnormal user data access behavior.

FIG. 3 is a flow diagram of one embodiment of a method 300 for identifying abnormal user data access behavior. The method 300 is performed by processing logic that may comprise hardware (circuitry, dedicated logic, etc.), software (such as is run on a general purpose computer system or a dedicated machine), or a combination of both. The method 300 may be performed by a behavior detector hosted by an endpoint device or server (e.g., behavior detector 200 of FIG. 2).

Referring to FIG. 3, at block 302 of method 300 processing logic receives data access records. The data access records may be received from endpoint devices and/or storage servers. In one embodiment, processing logic stores the data access records in a compressed format in a database.

At block 304, processing logic determines a user data access behavior pattern for a user based on the data access records. In one embodiment, determining the user data access behavior pattern includes determining an average weekly data access count and a standard deviation of weekly data access counts for the user. Alternatively, or in addition, processing logic may determine an average daily data access count and/or an average monthly data access count. In one embodiment, processing logic computes a median weekly data access count rather than an average data access count. Alternatively, processing logic may generate a statistical value that is based on a combination of the average and the median.

At block 306, processing logic receives new data access records. At block 308, processing logic determines whether the user's recent data access behavior deviates from the user data access behavior pattern based on comparing the new data access records to the user data access behavior pattern. At block 310, if the user's recent data access behavior does deviate from the user data access behavior pattern, the method continues to block 312 and an alert is generated. Alternatively, or in addition, other actions may be performed, such as locking the user's workstation, encrypting data accessed by the user, etc. At block 310, if the user's recent data access behavior does not deviate from the user data access behavior pattern then the method ends.

Figure 4:
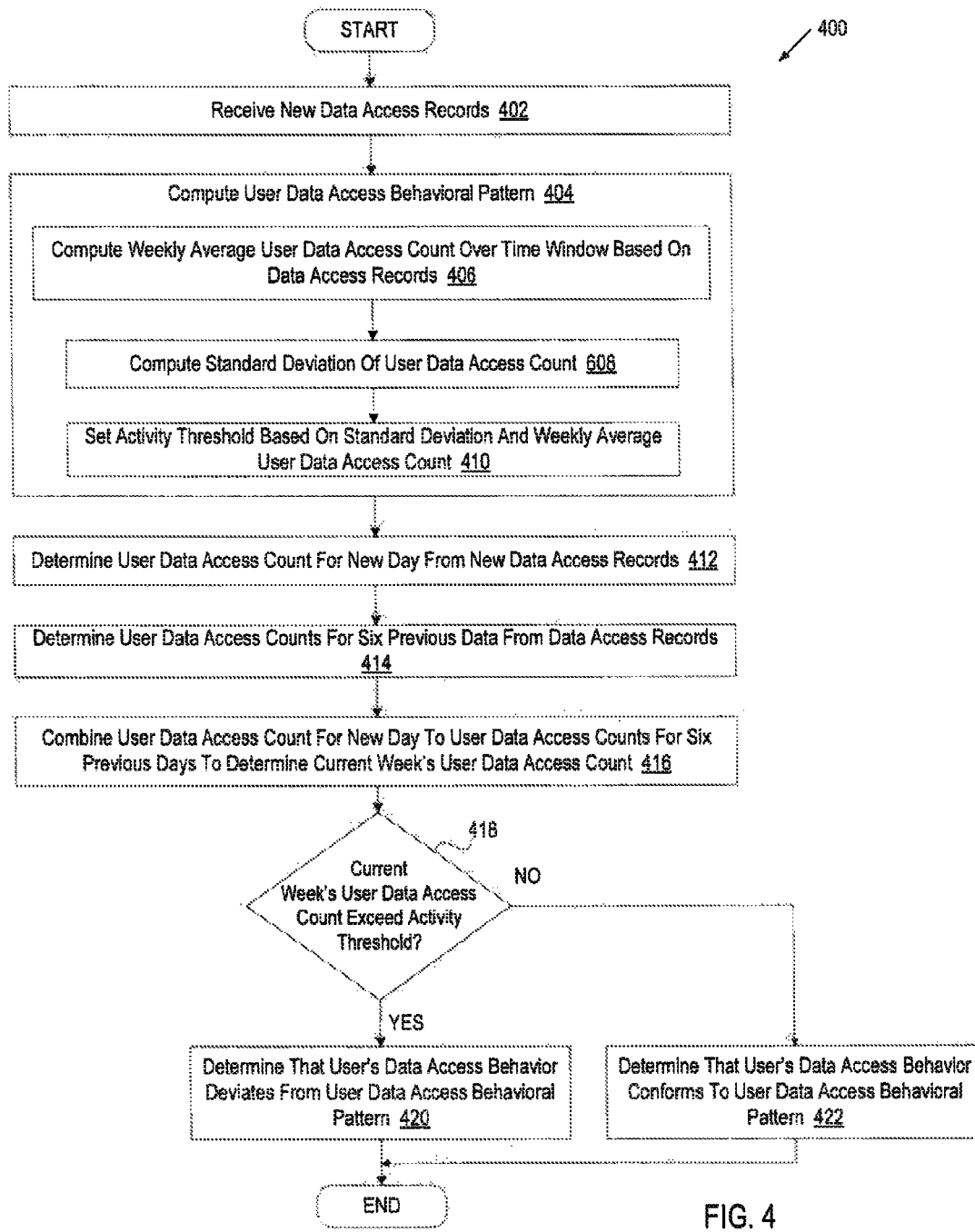
FIG. 4 is a flow diagram of one embodiment of a method for determining and applying user data access behavior patterns.

FIG. 4 is a flow diagram of another embodiment of a method 400 for determining and applying user data access behavior patterns. The method 400 is performed by processing logic that may comprise hardware (circuitry, dedicated logic, etc.), software (such as is run on a general purpose computer system or a dedicated machine), or a combination of both. The method 400 may be performed by a behavior detector hosted by an endpoint device or server (e.g., behavior detector 200 of FIG. 2).

Referring to FIG. 4, at block 402 of method 400 processing logic receives new data access records. Processing logic may store the new data access records along with previously received data access records.

At block 404, processing logic computes a user data access behavior pattern. In one embodiment, this includes computing a weekly average user data access count over a time window (e.g., one month) based on the previously received data access records (block 406) and computing a standard deviation of the user data access count (block 608). In one embodiment, at block 410, processing logic sets an activity threshold based on the standard deviation and weekly average user data access count. The activity threshold may be, for example, three standard deviations above the average user data access count.

At block 412, processing logic determines a user data access count for a new day from the new data access records. At block 414, processing logic determines user data access counts for six previous days from the previously received data access records. At block 416, processing logic combines user data access counts for the new day to user data access counts for the six previous days to determine a current week's user data access count. Note that the user data access counts for the six previous days are used to compute both the weekly average and to compute the current week's user data access count.

At block 418, processing logic determines whether the current week's user data access count exceeds the activity threshold. If the current week's user data access count exceeds the activity threshold, the method continues to block 420, and processing logic determines that the user's data access behavior deviates from the user data access behavior pattern. Otherwise, the method continues to block 422, and processing logic determines that the user's data access behavior conforms to the user data access behavior pattern.

Figure 5:
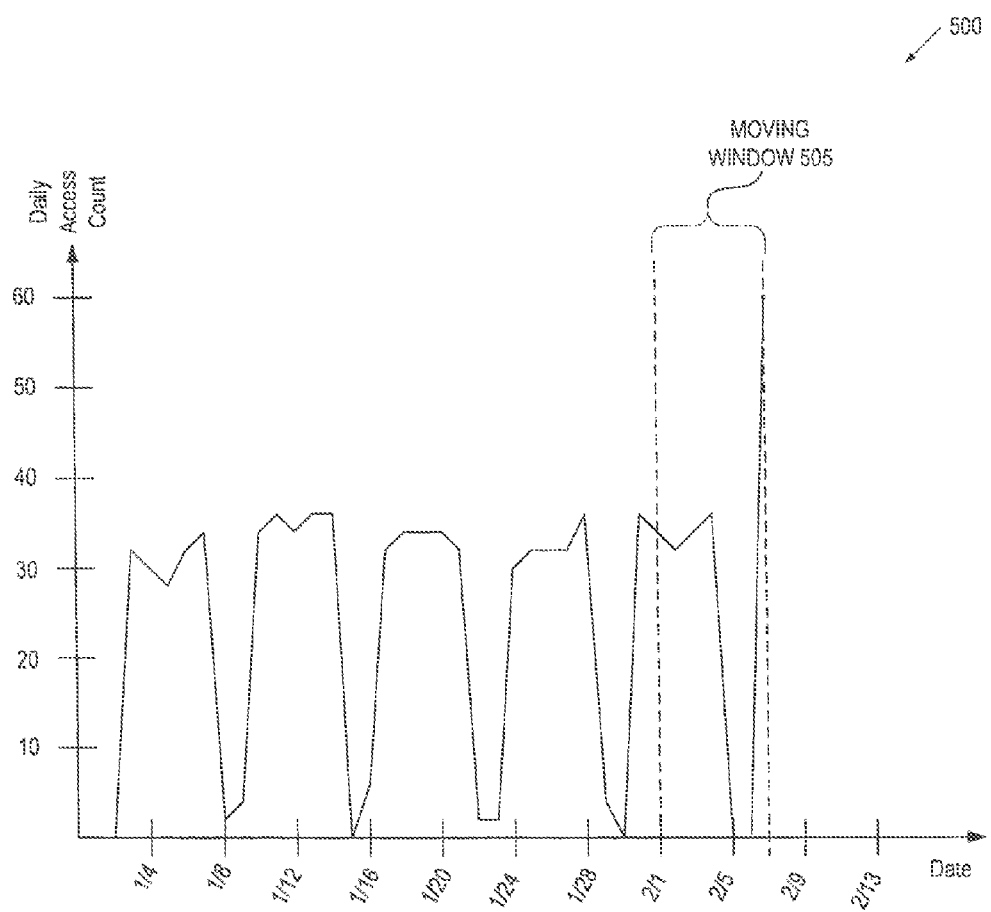
FIG. 5 is a graph showing daily user data access counts.

FIG. 5 is a graph 500 showing example daily user data access counts. The vertical axis represents the user data access count and the horizontal axis represents a date. As shown, the example user has a daily data access count that varies between approximately 28 data accesses and 36 data accesses during the week and 0 to 2 data accesses during the weekend. A 7 day moving window 505 is shown that includes a current day and 6 previous days. As shown, the data access count for the current day has jumped to 60, well above the user's normal behavior.

Figure 6:
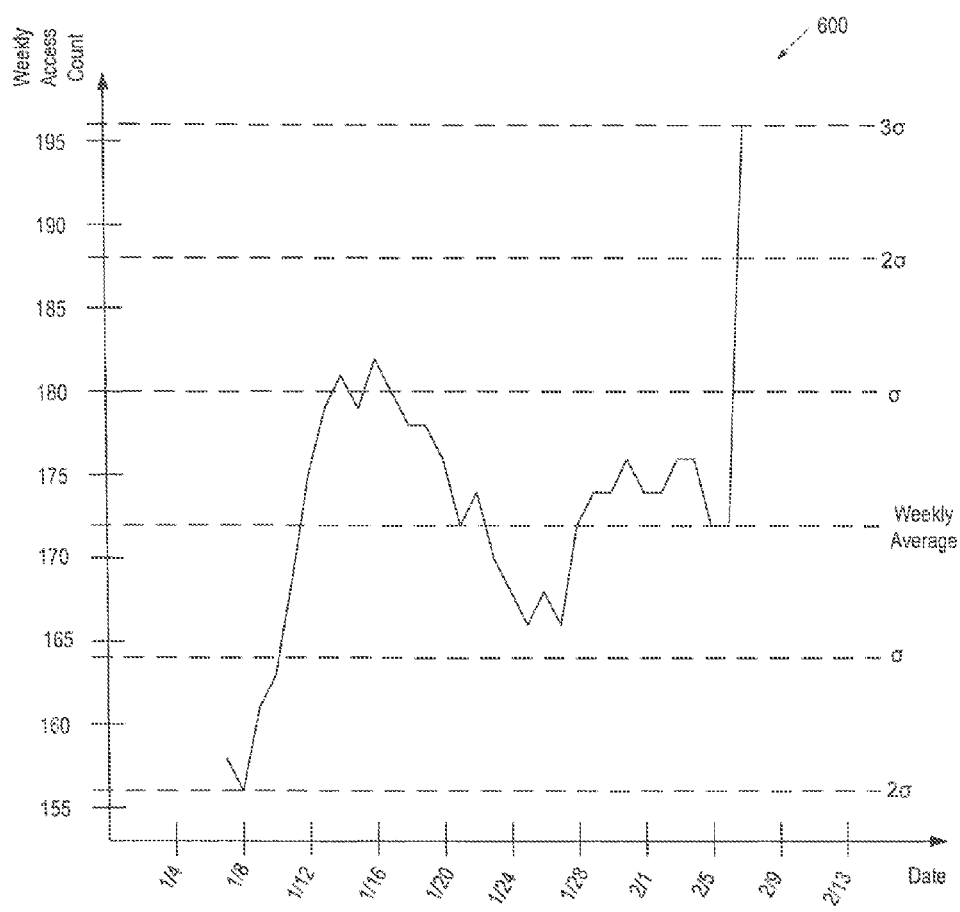
FIG. 6 is a graph showing a weekly data access count over a 7 day moving window.

FIG. 6 is a graph 600 showing an example weekly data access count over a 7 day moving window. Graph 600 is based on the data shown in graph 500. In graph 600, the weekly data access count value for each day includes a sum of that day's data access count plus the data access counts of the six previous days. The weekly data access count for the example user typically ranges from about 156 to about 183, with a weekly average of 172. The computed standard deviation is 8. As shown, a high user data access count for the current day has caused the weekly data access count for the current day to reach three standard deviations above the weekly average. This may trigger an alert that the user's data access behavior has deviated from his user data access behavior pattern.

Figure 7:
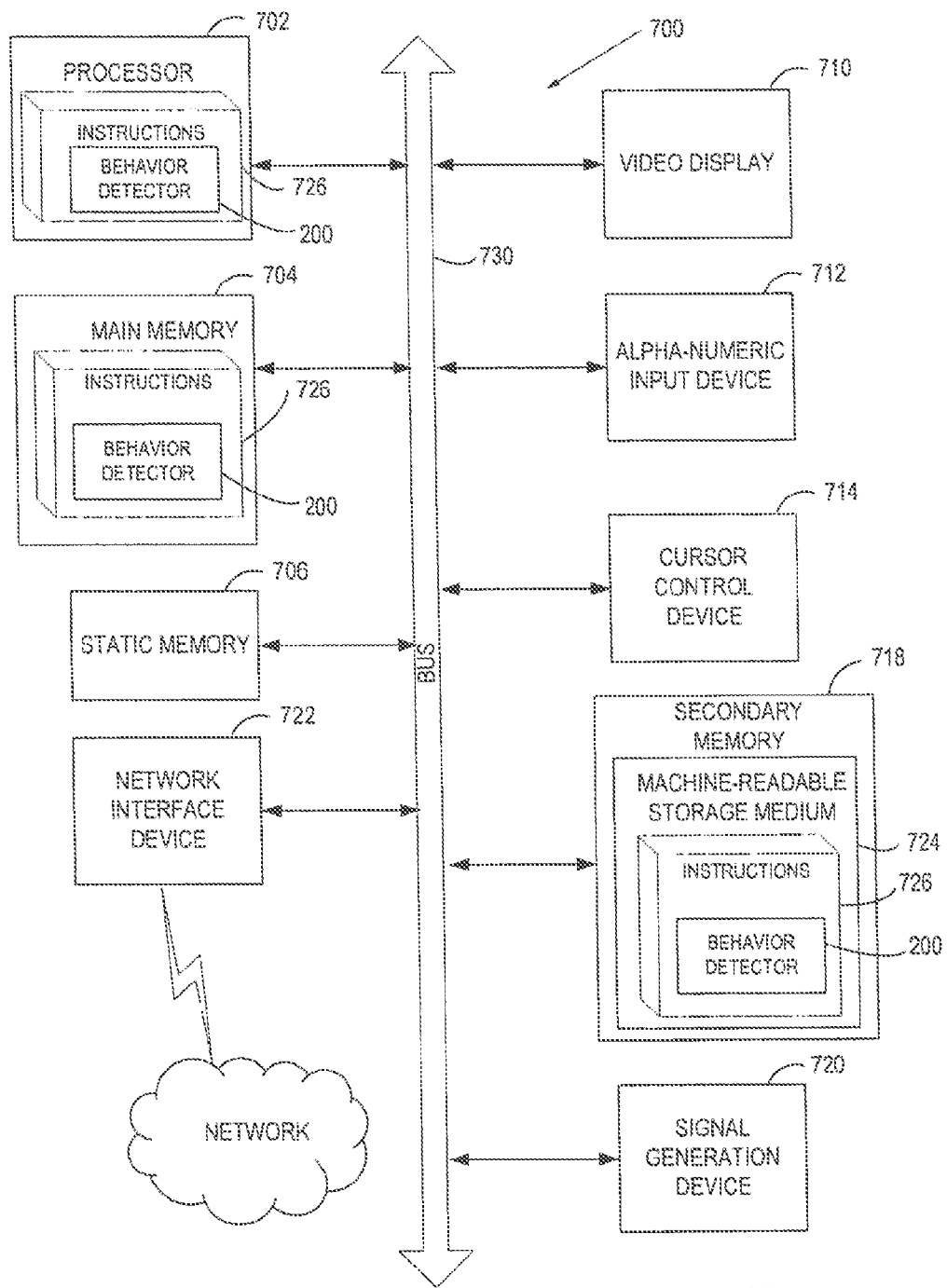
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute instructions 726 (e.g., processing logic) for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 (e.g., software) embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

The machine-readable storage medium 724 may also be used to store the behavior detector 200 of FIG. 2, and/or a software library containing methods that call the behavior detector. While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
    receiving, from a data loss prevention (DLP) agent running on an endpoint device, data access records by a processing device executing a DLP server;
    determining, by the processing device, a data access behavior pattern for at least one of a file or a directory based on the data access records, wherein the data access behavior pattern is user independent;
    receiving, by the processing device, a confirmation request from the DLP agent that has blocked an access event for at least one of the file or directory on a local storage device of the endpoint device on which the DLP agent runs, the confirmation request comprising a new data access record associated with the blocked access event;
    identifying deviation from the data access behavior pattern based on the new data access record;
    determining, based on the data access behavior pattern and the new data access record, a risk rating indicating a risk that the access event represents malicious activity;
    responsive to determining that the deviation is below a threshold, sending a confirmation message to the DLP agent, the confirmation message comprising an instruction to permit the access event for at least one of the file or the directory on the local storage device of the endpoint device; and
    responsive to determining that the deviation exceeds the threshold, generating an alert indicating that data access activity for at least one of the file or the directory has deviated from the data access behavior pattern, wherein the alert comprises the risk rating.

2. The method of claim 1, wherein determining the data access behavior pattern comprises:
    computing at least one of an average or a median of data access activity for at least one of the file or the directory based on the data access records; and
    computing an activity threshold for at least one of the file or the directory based on at least one of the average or the median of the data access activity.

3. The method of claim 2, wherein identifying the deviation from the data access behavior pattern comprises:
    determining, from the new data access record, whether new data access activity for at least one of the file or the directory exceeds the activity threshold.

4. The method of claim 1, wherein the new data access record is for a new day, and wherein determining the data access behavior pattern comprises:

computing a weekly average data access count over a time period based on the data access records;
computing a standard deviation of the data access count; and
using the standard deviation and the weekly average data access count to set an activity threshold.

5. The method of claim 4, wherein identifying deviation from the data access behavior pattern comprises:
determining a data access count for the new day from the new data access record and one or more additional new data access records;
determining data access counts for six previous days from the data access records;
combining the data access count for the new day to the data access counts for the six previous days to determine a current week's data access count; and
identifying that the current week's data access count exceeds the activity threshold.

6. The method of claim 1, wherein the DLP agent is hosted by a storage server.

7. A non-transitory computer readable medium including instructions that, when executed by a processing device executing a data loss prevention (DLP) server, cause the processing device to perform operations comprising:
receiving data access records from a DLP agent running on an endpoint device;
determining, by the processing device, a data access behavior pattern for at least one of a file or a directory based on the data access records, wherein the data access behavior pattern is user independent;
receiving, by the processing device, a confirmation request from the DLP agent that has blocked an access event for at least one of the file or directory on a local storage device of the endpoint device on which the DLP agent runs, the confirmation request comprising a new data access record associated with the blocked access event;
identifying, by the processing device, deviation from the data access behavior pattern based on the new data access record;
determining, based on the data access behavior pattern and the new data access record, a risk rating indicating a risk that the access event represents malicious activity;
responsive to determining that the deviation is below a threshold, sending a confirmation message to the DLP agent, the confirmation message comprising an instruction to permit the access event for at least one of the file or the directory on the local storage device of the endpoint; and
responsive to determining that the deviation exceeds the threshold, generating, by the processing device, an alert indicating that data access activity for at least one of the file or the directory has deviated from the data access behavior pattern, wherein the alert comprises the risk rating.

8. The non-transitory computer readable medium of claim 7, wherein determining the data access behavior pattern comprises:
computing at least one of an average or a median of data access activity for at least one of the file or the directory based on the data access records; and
computing an activity threshold for at least one of the file or the directory based on at least one of the average or the median of the data access activity.

9. The non-transitory computer readable medium of claim 8, wherein identifying the deviation from the data access behavior pattern comprises:
determining, from the new data access record, whether new data access activity for at least one of the file or the directory exceeds the activity threshold.

10. The non-transitory computer readable medium of claim 7, wherein the new data access record is for a new day, and wherein determining the data access behavior pattern comprises:
computing a weekly average data access count over a time period based on the data access records;
computing a standard deviation of the data access count; and
using the standard deviation and the weekly average data access count to set an activity threshold.

11. The non-transitory computer readable medium of claim 10, wherein identifying deviation from the data access behavior pattern comprises:
determining a data access count for the new day from the new data access record and one or more additional new data access records;
determining data access counts for six previous days from the data access records;
combining the data access count for the new day to the data access counts for the six previous days to determine a current week's data access count; and
identifying that the current week's data access count exceeds the activity threshold.

12. The non-transitory computer readable medium of claim 7, wherein the DLP agent is hosted by a storage server.

13. A system comprising:
a memory to store instructions for a behavior detector; and
a processing device coupled to the memory to execute the instructions, wherein the processing device is configured to:
receive data access records from a data loss prevention (DLP) agent running on an endpoint device;
determine a data access behavior pattern for at least one of a file or a directory based on the data access records, wherein the data access behavior pattern is user independent;
receive a confirmation request from the DLP agent that has blocked an access event for at least one of the file or directory on a local storage device of the endpoint device on which the DLP agent runs, the confirmation request comprising a new data access record associated with the blocked access event;
identify deviation from the data access behavior pattern based on the new data access record;
determine, based on the data access behavior pattern and the new data access record, a risk rating indicating a risk that the access event represents malicious activity;
responsive to a determination that the deviation is below a threshold, send a confirmation message to the DLP agent, the confirmation message comprising an instruction to permit the access event for at least one of the file or the directory on the local storage device of the endpoint device; and
responsive to a determination that the deviation exceeds the threshold, generate an alert indicating that data access activity for at least one of the file or the directory has deviated from the data access behavior pattern, wherein the alert comprises the risk rating.

14. The system of claim 13, wherein determining the data access behavior pattern comprises:
computing at least one of an average or a median of data access activity for at least one of the file or the directory based on the data access records; and computing an activity threshold for at least one of the file or the directory based on at least one of the average or the median of the data access activity.

15. The system of claim 14, wherein identifying the deviation from the data access behavior pattern comprises:
determining, from the new data access record, whether new data access activity for at least one of the file or the directory exceeds the activity threshold.

16. The system of claim 13, wherein the new data access record is for a new day, and wherein determining the data access behavior pattern comprises:
computing a weekly average data access count over a time period based on the data access records;
computing a standard deviation of the data access count; and
using the standard deviation and the weekly average data access count to set an activity threshold.

17. The system of claim 16, wherein identifying deviation from the data access behavior pattern comprises:
determining a data access count for the new day from the new data access record and one or more additional data access records;
determining data access counts for six previous days from the data access records;
combining the data access count for the new day to the data access counts for the six previous days to determine a current week's data access count; and
identifying that the current week's data access count exceeds the activity threshold.

18. The system of claim 13, wherein the DLP agent is hosted by a storage server.

* * * * *